US008438054B2

(12) United States Patent
Lowrance et al.

(10) Patent No.: US 8,438,054 B2
(45) Date of Patent: May 7, 2013

(54) APPARATUS AND METHODS FOR GENERATING AND ACCESSING ARGUMENTS

(75) Inventors: John D. Lowrance, Foster City, CA (US); Ian W. Harrison, Brooklyn, NY (US); Andres C. Rodriguez, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 1109 days.

(21) Appl. No.: 09/839,697

(22) Filed: Apr. 20, 2001

(65) Prior Publication Data

US 2002/0032574 A1 Mar. 14, 2002

Related U.S. Application Data

(60) Provisional application No. 60/232,186, filed on Sep. 12, 2000.

(51) Int. Cl.
*G06Q 40/00* (2012.01)
(52) U.S. Cl.
USPC .......... 705/7.36; 705/7.29; 705/7.37; 705/1.1
(58) Field of Classification Search .................. 705/1.1, 705/7.36, 7.37, 7.29
See application file for complete search history.

(56) References Cited

U.S. PATENT DOCUMENTS

| | | | | |
|---|---|---|---|---|
| 5,406,477 A * | 4/1995 | Harhen | ............................. | 703/6 |
| 5,461,699 A * | 10/1995 | Arbabi et al. | .................... | 706/21 |
| 5,819,248 A * | 10/1998 | Kegan | .............................. | 706/45 |
| 5,953,707 A * | 9/1999 | Huang et al. | .................... | 705/10 |
| 6,098,062 A * | 8/2000 | Janssen | ............................ | 706/59 |
| 6,192,364 B1 * | 2/2001 | Baclawski | ............................ | 1/1 |
| 6,321,225 B1 * | 11/2001 | Heckerman et al. | ................... | 1/1 |
| 6,405,221 B1 * | 6/2002 | Levine et al. | ................. | 715/234 |
| 6,606,615 B1 * | 8/2003 | Jennings et al. | ................ | 706/45 |
| 6,751,600 B1 | 6/2004 | Wolin | | |
| 6,826,552 B1 * | 11/2004 | Grosser et al. | ................... | 706/47 |
| 2001/0032092 A1 * | 10/2001 | Calver | ............... | 705/1 |
| 2001/0047290 A1 * | 11/2001 | Petras et al. | .................... | 705/10 |
| 2001/0051913 A1 * | 12/2001 | Vashistha et al. | ............... | 705/37 |
| 2002/0016731 A1 * | 2/2002 | Kupersmit | ...................... | 705/10 |
| 2002/0052774 A1 | 5/2002 | Parker et al. | | |
| 2003/0182168 A1 | 9/2003 | Lyons | | |
| 2003/0227479 A1 | 12/2003 | Mizrahi et al. | | |
| 2010/0005081 A1 | 1/2010 | Bennett | | |

OTHER PUBLICATIONS

Wong, S.T. C. "Preference-Based . . . Systems", ACM Transactions on Information Systems, vol. 12, No. 4, Oct. 1994, pp. 407-435.*

(Continued)

*Primary Examiner* — Dean T Nguyen

(57) ABSTRACT

In one embodiment, an analytical system for generating and accessing arguments is disclosed. Each argument is associated with a conclusion indicating whether a particular situation will likely have a negative or positive result. One embodiment of the analytical system includes a database for storing a plurality of templates, each template including a plurality of questions which may be answered to generate a particular argument having an associated conclusion that is based on those answers. The analytical system also includes an argument server that includes means for a user to select a template that is most relevant to a particular situation, means for receiving answers to one or more of the selected template's questions such that a new argument is generated having a conclusion based on those answers, and means for associating supporting evidence provided by the user with each answer.

32 Claims, 14 Drawing Sheets

OTHER PUBLICATIONS

Lazaroff, Mark, "Project Genoa Crisis Scope", . . . Data Item 2002, Pacific-Sierra Research, SRI International, Apr. 30, 1998, pp. 1-46.*

"Introduction to Facilitate.com 8.0", www.facilitate.com/introduction.html, date unknown, printed May 25, 2004.

"Intranet: Intranets.com: Have your secure intranet up & running in minutes," www.intranets.com/, date unknown, printed Jun. 23, 2004.

"MindGenius", www.mindgenius.com/website/home.aspx, date unknown, printed Jun. 23, 2004.

"Visual Mind—Mind Mapping Software," www.visual-mind.com/download.htm, date unknown, printed Jun. 23, 2004.

"SkyMark's PathMaker softwar e unites all the tools you need for planning, problem-solving, etc.," www.skymark.com/, date unknown, printed Jun. 23, 2004.

Wikipedia, The Free Encyclopedia, "Information theory", Wikimedia Foundation, Inc., [Retrieved from the internet on Apr. 8, 2010],< http://en.wikipedia.org/wiki/Information_theory>, Last modified Apr. 2, 2010.

Miller, George A., "WordNet, A lexical database for English, WordNet Documentation, WordNet 3.0 Reference Manual," Princeton University, <http://wordnet.princeton.edu>, 2009.

Lazaroff, Mark, "Project Genoa CrisisScope, Technical Report 1 and Recommendations of the Research", Data Item A0002, Pacific-Sierra Research, SRI International, Apr. 30, 1998.

* cited by examiner

Situation Descriptor for Argument IRAQ-99

[ OK ] [ print ] [ exit ]

- Perspective: I
- Time Interval: 1 / 1 / 1999 to 31 / 1 / 1999 (format is dd/mm/yyyy)
- Actor:
- Actor Description:
- Region: IRAQ
- Event: TRADE-RELATED
- Event Description: Trade sanctions invoked.
- Comments and Assumptions: This is an historical analysis done after the fact.

| Component | Perspective | Actor |
|---|---|---|
| LEADERSHIP.IRAQ-99 | LEADERSHIP-AND-INTENT | |
| SOCIAL.IRAQ-99 | SOCIAL | |
| POLITICAL.IRAQ-99 | POLITICAL | |
| MILITARY.IRAQ-99 | MILITARY | |
| EXTERNAL.IRAQ-99 | EXTERNAL | |
| ECONOMIC.IRAQ-99 | ECONOMIC | |

SEAS - Unpublished Copyright 1998-2000, SRI International

Argument: ECONOMIC.IRAQ-99

13-03-1999
13-03-1999

---

Base Question:
BUDGET CRISIS: Is a budge crisis developing or worsening?

Consider the following:
- Rising budget deficit
- Increased external/internal borrowing
- Deteriorating foreign/short-term debt structure
- Fiscal speding is exceeding revenue collection

---

Analyst: Seas Using Fusion Method Maximum, On, 07-11-2000 13:38:23

○ Very likely
● Likely
◐ Possibly
○ Unlikely
○ Very unlikely

Rationale

Based upon historical data, there is reason to expect a budget crisis. — 1204

---

Documentary Evidence [2] (with [Maximum ⇕] Fusion Method)

Iraq Sanctions Case
  Analyst: John D. Lowrance, SRI Inernational    ○ ● ○ ○ ○ } 1202a
  On: 02-11-2000 10:48:13
  Relevance: In addition to Iraq's ability to finance itself through stolen gold and durable goods, there are rumors abound about large, undeclared Iraqi bank accounts abroad.

Iraq Economy 1995 Summary
  Analyst: John D. Lowrance, SRI Inernational    ○ ○ ◐ ● ○ } 1202b
  On: 11-04-2000 14:46:09
  Relevance: Historically, Iraq has had a very volatile economy.

TIP: to create a new Documentary Evidence, first create it as an Exhibit and then promote it.

---

Exhibits [1]

Iranian economic argument

TIP: To add an Exhibit, click on the In-Basket button above.

---

Discovery Tools [3]

Google search for Iraq debt
  Excite search for Iraq debt
  ABC Country Book - Economy

---

SEAS - Unpublished Copyright 1998-2000, SRI International

FIG. 12

APPARATUS AND METHODS FOR GENERATING AND ACCESSING ARGUMENTS

CROSS REFERENCE TO RELATED APPLICATIONS

This application claims priority under 35 U.S.C. §119(e) from co-pending U.S. Provisional Patent Application No. 60/232,186, filed Sep. 12, 2000, entitled "SCOPE EVIDENTIAL ARGUMENTATION SYSTEM" by J. D. Lowrance, et al, which application is incorporated herein by reference in its entirety for all purposes.

U.S. GOVERNMENT RIGHTS

This application was made with government support under contract number N66001-97-C-8551, subcontract No. PSR-97-8551-00-SC-01, awarded by the Defense Advanced Research Projects Agency and the Office of Naval Research. The government has certain rights in this invention.

BACKGROUND OF THE INVENTION

The present invention relates generally to analytical tools for facilitating decision making. More specifically, the present invention relates to methods and apparatus for building arguments to support a conclusion as to whether a particular situation is likely to have a negative or positive outcome.

The survival of an enterprise often rests upon its ability to make correct and timely decisions, despite the complexity and uncertainty of the environment. Understanding the world and facing the different alternatives it presents us is crucial in any effort.

Different studies and formalisms of argumentation have come out of different fields such as philosophy (Lorenzen and Lorenz 1977; Perelman (1970); Perelman and Olbrechts-Tyteca 1958; Toulmin 1958), decision analysis (Sycara 1990), and artificial intelligence (Dung 1995). These formalisms attempt to deal with the uncertainty inherently present in the world. Behind every decision, though, there is an argument supporting it, and arguments range from rhetorical explanations to mathematical proofs. Argumentation theory leverages problem solving under uncertainty by supporting qualitative and quantitative approaches.

Analysis, on the other hand, deals with the examination and separation of a complex situation, its elements, and its relationships. More often than not, the situation is full of unknowns, uncertainties, and deliberate misinformation. The analyst is confronted not only with the facts, but also with his or her knowledge about the facts and assumptions, others possible knowledge, the hypotheses that can be drawn from those facts, and the evidence supporting and contradicting those hypotheses (Heuer 1999).

Conventional analytic products are recorded as text, such as messages, Web pages, or documents. One drawback with these forms of recorded arguments is that they are time consuming to read and comprehend, slowing comparisons and explanations. Although text-processing tools help to streamline production of these products, they provide little or no support in guaranteeing that the arguments are comprehensive and easily understood. Many of the attempts made to introduce automation into the decision making process are based on decision theoretic constructs and tend to suffer from the same drawbacks:

These models reduce the analyst's role to that of data entry, making the models unpopular with analysts. Additionally, explanations given for the conclusions are often incomprehensible to analysts, since the lines of reasoning are explained in terms of conditional probabilities, making the conclusions hard to accept. Even if an analyst were to accept a role limited to data entry and come to believe the conclusions based on a history of success, the world would change, requiring that the analytic model be updated, which the analysts are unable to do. Because of these problems, the tools typically fall into disuse even when they had been initially successful. Because of the difficulty of employing formal methods, decision makers typically resort to informal methods, sacrificing structure and rigor.

Accordingly, it is desirable to provide a user-centric analytical tool that allows users of different levels of expertise to easily and efficiently engage in the process of argument creation and analysis.

SUMMARY OF THE INVENTION

Accordingly, specific embodiments of the present invention provide an apparatus and method for facilitating decision making. In general terms, the present invention is based on the concept of a structured argument having a plurality of questions that are used to assess whether an opportunity or threat of a given type is imminent. These questions are called the argument's template (as opposed to the argument, which is an instantiation of the template). In one implementation, the structured argument is based on a hierarchically organized set of questions (e.g., a tree structure).

This hierarchy of lower level questions supporting higher level questions may go a few levels deep before bottoming out in questions that are to be directly assessed and answered. Preferably, these are multiple-choice questions, with the different answers corresponding to discrete points or subintervals along a continuous scale, with one end of the scale representing strong support for a particular type of opportunity or threat and the other end representing strong refutation. Leaf or children nodes represent primitive questions, and internal or parent nodes represent derivative questions. The links represent support relationships among the questions. Derivative questions are supported by all the derivative and primitive questions linked below it. Preferably, documentary or other supporting evidence and rationale are associated with each answer to a question so that an analyzer may quickly determine the line of reasoning of the argument.

In one embodiment, an analytical system for generating and accessing arguments is disclosed. Each argument has an associated conclusion as to whether a particular situation will likely have a negative or positive result. The analytical system includes a database for storing a plurality of templates that each include a plurality of questions which may be answered to generate a particular argument having an associated conclusion regarding a particular situation that is based on answers to its associated template questions. The system further includes an argument server for selecting one of the templates which is most relevant to a particular situation and for receiving input to one or more of the selected template's questions to thereby generate a new argument having an associated conclusion based on such answers. The associated conclusion indicates whether the particular situation will likely have a positive or negative result.

In another aspect, the invention pertains to a method for accessing or generating an argument having a conclusion for a particular situation. A plurality of templates are searched for a relevant template most related to a particular situation. Each template includes a plurality of questions. One or more questions of the relevant template are answered to then form a new argument having a conclusion based on the one or more answers.

In another aspect, the invention pertains to a computer readable medium containing program instructions for accessing or generating an argument having a conclusion for a particular situation. The computer readable medium includes computer code for performing at least some of the above described method operations and a computer readable medium that stores the computer codes. In another aspect, a computer system operable to access or generate an argument having a conclusion for a particular situation is disclosed. The computer system includes one or more processors and one or more memory. At least one of the processors and memory are adapted to perform at least some of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 10 is an example of a situation descriptor viewer/editor for managing the situation descriptors that are associated with a particular argument and template;

FIG. 12 illustrates an example question having two pieces of associated documentary evidence.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
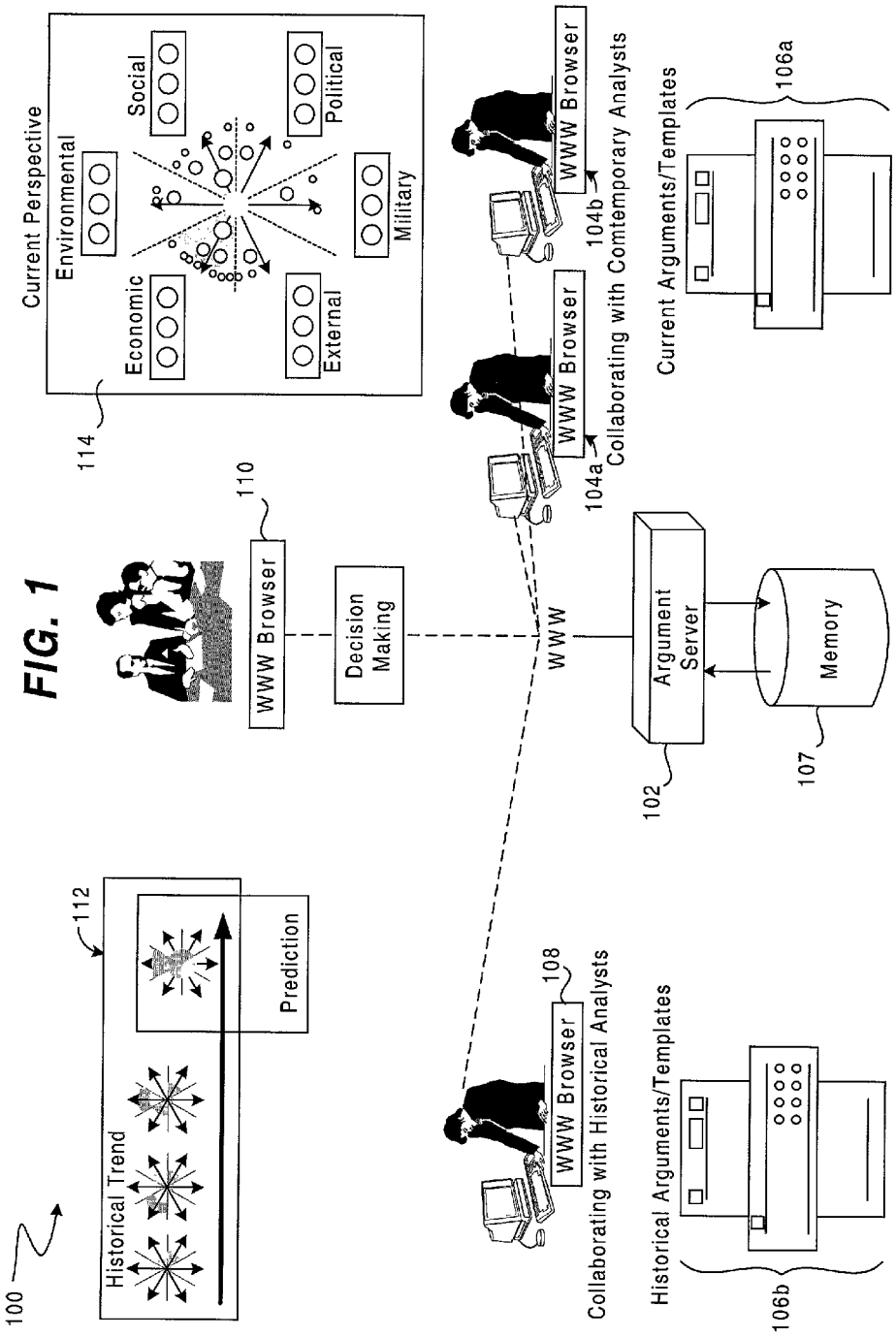
FIG. 1 is a diagrammatic representation of an analytical system implemented within a computer network in accordance with one embodiment of the present invention.

FIG. 1 is a diagrammatic representation of an analytical system 100 implemented within a computer network in accordance with one embodiment of the present invention. As shown, the analytical system 100 includes an argument server 102 and a memory unit 107. Any suitable processing unit, such as one or more general purpose computer, may be configured to provide the capabilities (as described further below) of the argument server 102 and memory 107. The memory 107 is generally used to store a plurality of templates and arguments 106. Each template includes a plurality of questions that are relevant for reaching a conclusion regarding a particular situation.

The templates are preferably generated by decision making experts (e.g., via browser 108 and argument server 102). A user may form an argument by selecting and instantiating a template (e.g., via browser 104a and argument server 102). The user may at least partially complete the instantiated argument by answering one or more questions of the instantiated argument and associating rationale statements and supporting relevant evidence with each answered question. The user may also associate exhibits with one or more questions that may be relevant to answering such question so that other collaborative users may answer the question using the associated exhibit which is then "promoted" to relevant evidence (e.g., via browser 104b and argument server 102). Alternatively, the user who initiates the exhibit may "promote" the exhibit to documentary evidence to support an answer to a question after analyzing the exhibit further.

Memory 107 may contain both historical arguments/templates 106b and current arguments/templates 106a. The historical arguments/templates include arguments and templates that have been completed and stored within memory 107 (also referred to as "published" arguments). The current arguments/templates include arguments and templates that are currently being generated by one or more users. In a preferred embodiment, current users collaborate within a computer network (e.g., via browsers 104a and 104b and argument server 102) to form current arguments and templates 106a. These users may also, in effect, collaborate with users from the past by accessing and using historical arguments and/or templates 106b to form current arguments and/or templates 106a. Alternatively, the collaborators may generate a current argument and template that is not based on a historical argument or template. That is, a new template is generated and instantiated as a current argument. After the argument or template is generated by the collaborating users, the finished arguments and templates are then stored in memory 107 as historical arguments and templates 106b.

Via argument server 102, users may then access the historical and current arguments and templates 106b for decision making purposes. For example, users may access past situations and conclusions represented in historical arguments and compare these past situations to a current situation to predict the outcome of the current situation. In the illustrated example, decision makers access historical arguments and templates 106b via browser 110, argument server 102, and memory 107. For example, the decision makers view graphical representations 112 of the historical arguments and templates 106b through browser 110. These graphical representations 112 present the generated arguments and templates in a form that facilitates decision making. In one embodiment, several historical arguments may be compiled together into a single graphical representation to evaluate a historical trend for a particular situation. Users may also review graphical representations of current arguments 114 (that may be based on historical templates or generated from a newly created template) to aid in forming a new conclusion regarding a current situation through browser 110, argument server 102, and memory 107.

Figure 2:
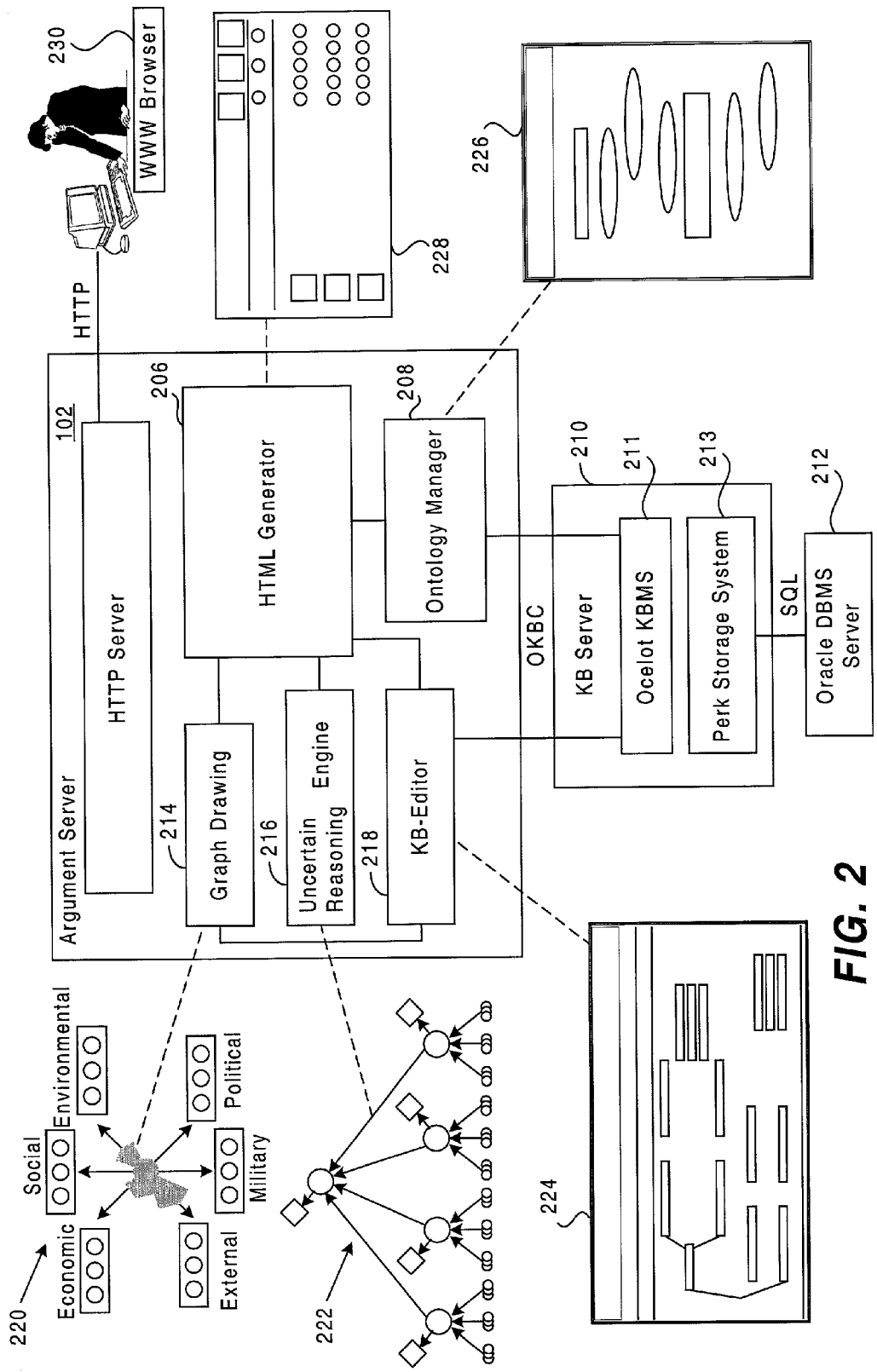
FIG. 2 is a diagrammatic representation of the argument server of FIG. 1 in accordance with one embodiment of the present invention.

The argument server 102 may be configured with any suitable combination of software and/or hardware. FIG. 2 is a diagrammatic representation of the argument server 102 of FIG. 1 in accordance with one embodiment of the present invention. As shown, the argument server 102 includes HTTP server 202, HTML generator 206, ontology manager 208, a graph drawing block 214, Uncertain Reasoning engine 216, and a knowledge base (KB) editor 218. The argument server 102 is also associated with knowledge base (KB) server 210 and SQL server 212.

Any suitable memory management scheme may be utilized for storing arguments and templates within memory 107. In the illustrated embodiment, KB server 210 accesses and retrieves objects from memory 107 via SQL server 212. Any suitable SQL server 212 may be utilized. In one example, an Oracle data base management system (DBMS) server may be used. The KB server 210 may have any suitable configuration. In the illustrated embodiment, the KB server 210 is formed from an Ocelot knowledge base management system (KBMS) 211 and a Perk storage system 213. The KBMS 211 is generally configured to change slot values and KB frames that represent question answers that are to be stored in memory 107, as well as performing calls to memory 107. The Perk storage system 213 moves KB frames to and from temporary memory to and from database memory 107, as well as handling calls to database memory 107. The Oracle DBMS 212 retrieves and updates the database 107 to reflect changes in a knowledge base frame. Alternatively, the database 107 may simply be managed by a single SQL server 212.

The ontology manager 208 generally updates answers to questions within templates located in memory 107, as well as calling objects (e.g., templates and arguments) from memory 107 via KB Server 210 and SQL server 212. The HTML generator 206 interprets a command from the user for changing an answer to an argument question, as well as calling objects from memory 107 via ontology manager 208, KB Server 210 and SQL server 212. The HTTP server 202 responds to a user's request regarding a web page by querying the HTML generator 206 for such page and then sending the page to the user.

The graph drawing block 214 generally provides graphical representations of templates and arguments. The Uncertain Reasoning engine 216 generally provides mechanisms for propagating probabilities of answers to a hierarchical set of questions, as explained further below. The KB editor 218 generally provides mechanisms for editing elements within the KB database. Of course, one or more of the functional blocks associated with the server 102 may be combined or arranged in any suitable combination and number of functional blocks.

Figure 3:
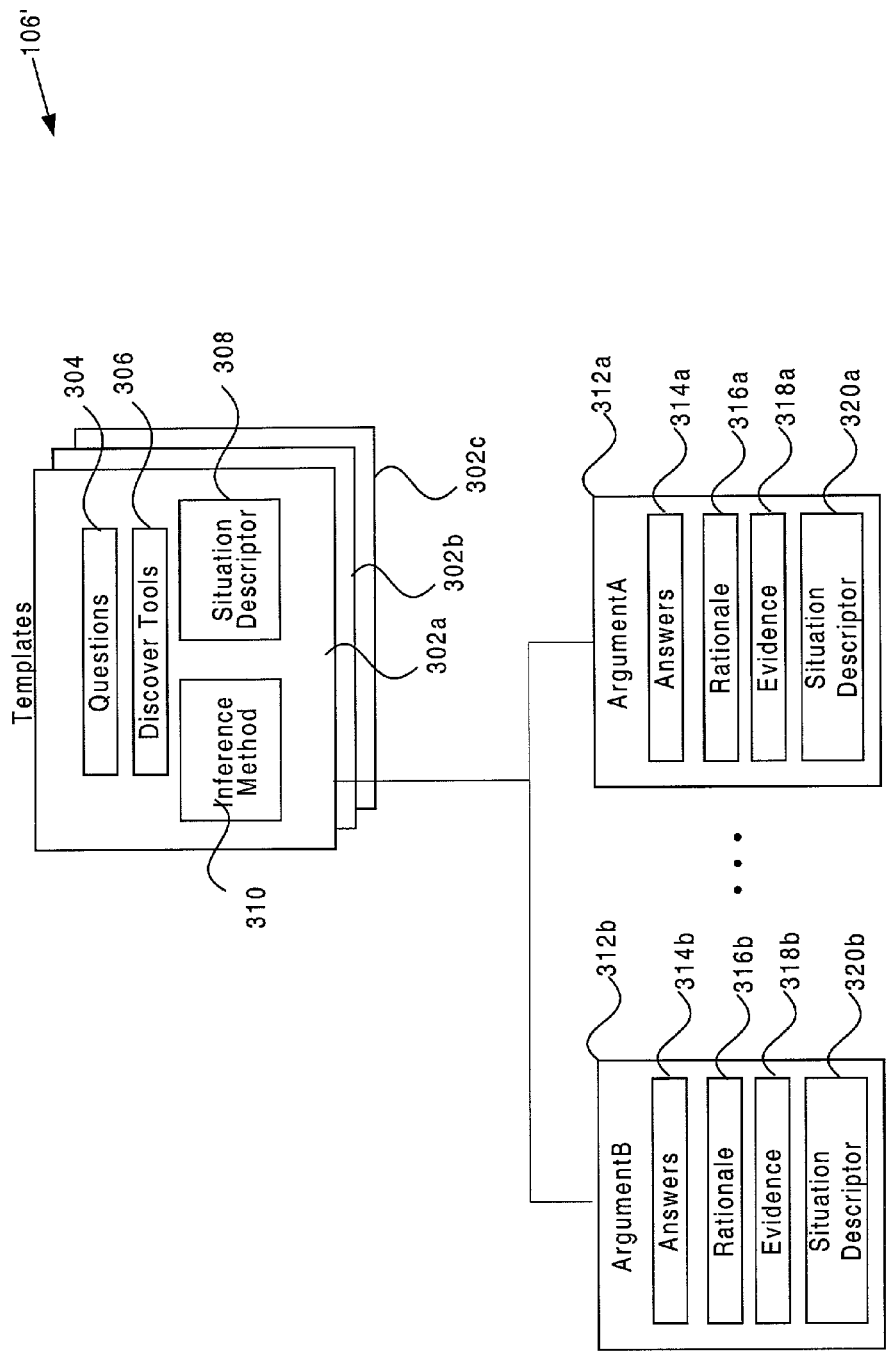
FIG. 3 is a diagrammatic representation of a set of templates and arguments in accordance with one implementation of the present invention.

FIG. 3 is a diagrammatic representation of a set of templates and arguments 106' in accordance with one implementation of the present invention. As shown, each template 302 includes a plurality of questions 304, discovery tools 306, an inference method 310, and a situation descriptor 308. In a preferred embodiment, the questions are arranged hierarchically for facilitating determination of a particular conclusion.

Figure 4:
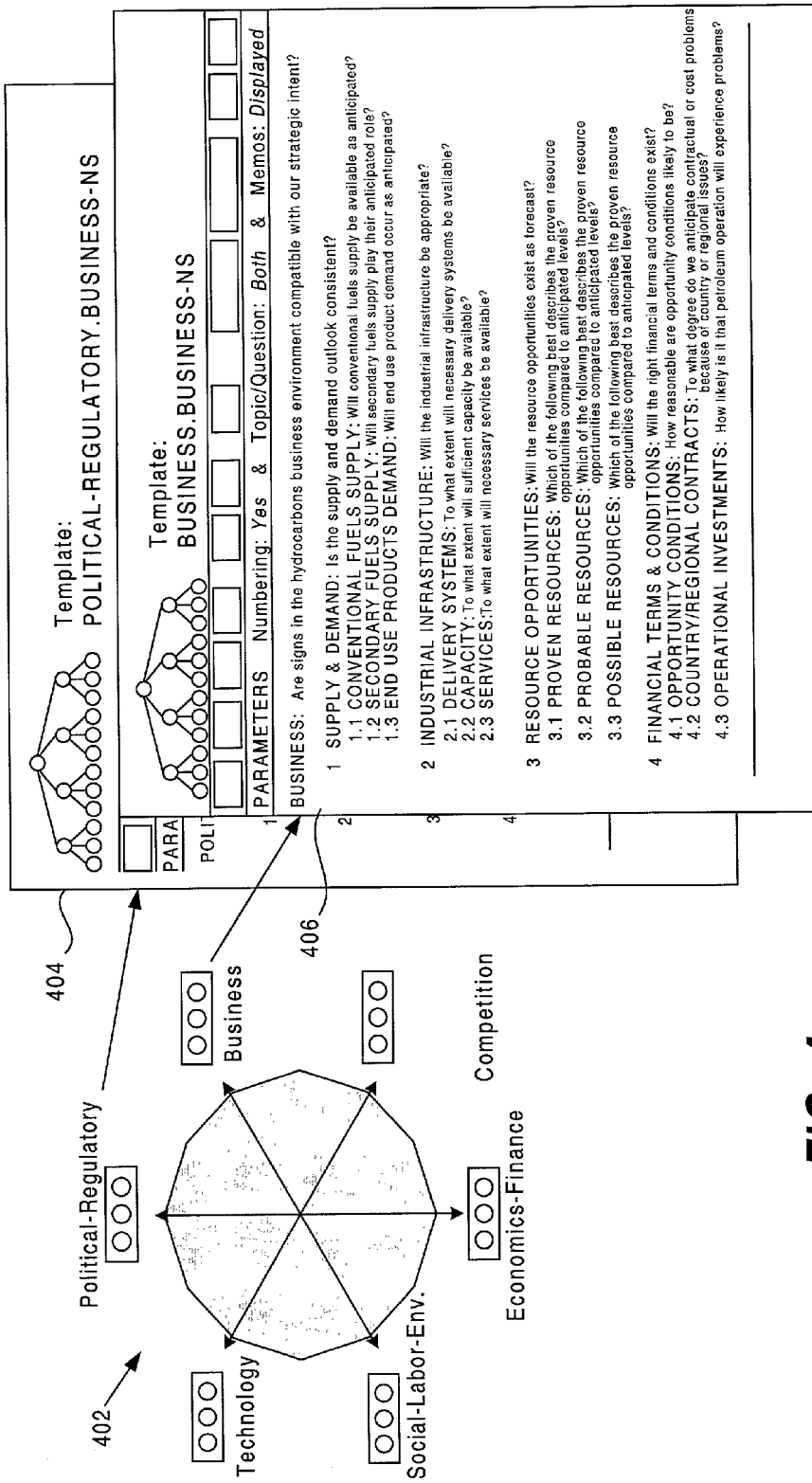
FIG. 4 illustrates particular details of a template in accordance with one embodiment of the present invention.

FIG. 4 illustrates particular details of template 302a of FIG. 3. Template 302a includes a number of categories of questions 402 for reaching a conclusion for a typical business type situation. The illustrated business situation and main question is "whether a hydrocarbon type business is likely to become unstable." Each category 402 may have an associated hierarchy of questions. An expanded view is shown for categories 404 and 406. As shown, there is a hierarchy of questions for a "political and regulatory" category 404 and for a "business" category 406. The main question is determined by all of these hierarchy of questions for each category 406. More specifically, the business category 406 includes a hierarchy of questions for answering the business category question "are there signs in the hydrocarbons business environment that are compatible with our strategic intent?" To answer this business category question, four lower level questions are to be answered. The four questions include:

1. Is the supply and demand outlook consistent?
2. Will the industrial infrastructure be appropriate?
3. Will the resource opportunities exist as forecast?
4. Will the right financial terms and conditions exist?

These four "children" questions each have three lower level questions. When the lowest level children questions are answered, the children answers may determine the answers for the higher level parent question. For example questions 4.1, 4.2, and 4.3 are answered to form the answers for question 4. Likewise, questions 3.1, 3.2, and 3.3 are answered to form the answer for question 3. Questions 2.1, 2.2, and 2.3 are answered to form the answer for question 2, and questions 1.1, 1.2, and 1.3 are answered to form the answer for question 1. The answers for questions 1 through 4 form the answer to the highest question for the business category 406 (are there signs in the hydrocarbons business environment that are compatible with our strategic intent?). Although the illustrated template 302a is shown as having multiple categories 402, a template may have only a single category, e.g., uni-dimensional.

Referring back to FIG. 3, each template 302 may include one or more discovery tools 306. A discovery tool generally provides mechanisms to aid in answering a question. By way of examples, the discovery tool may include a query to a search engine, a query to a database, a link to a web page, a reference to a cascaded template, or a call to any web accessible tool.

Each template 302 may also include one or more inference methods 301 for determining how to propagate answers from children questions up to their parent questions, which inference methods are explained further below. Each template also includes a situation descriptor 308 that describes the type of situations for which the template is intended to be used. The memory 107 may also contain an index for a plurality of situation descriptors. This index may be searched (e.g., via server 102) for situation descriptors that closely match a current situation to obtain possibly relevant templates for a current situation. The most relevant template may then be used to form a new or current argument for the current situation.

When a current argument is filled with answers to the associated template questions, the current argument may be saved as a historical argument. For example, the associated template is applied to the current situation. The associated template may also be applied to other situations to form other arguments having possibly varying conclusions. In other words, each new situation results in a new argument with a corresponding conclusion. Accordingly, each template may be associated with one or more arguments 312 as shown if FIG. 3.

As shown, each argument includes a plurality of answers 314, one or more rationale 316 associated with each answer, one or more pieces of relevant evidence 318 associated with each answer, and a situation descriptor 320. A rationale 316 generally specifies why a particular answer is given. The documentary evidence 318 also generally supports each answer by presenting one or more sources for the particular answer. That is, an evidence's relevance to the subject matter of an argument has been established and recorded. However, the evidence does not have to be documentary. In other words, the evidence may include anything that is helpful in forming a conclusion or judgement, as well as any species of proof presented for the purpose of inducing beliefs in a contention for a particular answer to a question. A situation descriptor 320 generally describes what an argument is about. For example, the situation descriptor describes the actors, the types of event under discussion, where or when the discussion occurs, and the perspective from which the situation is being analyzed.

Figure 5:
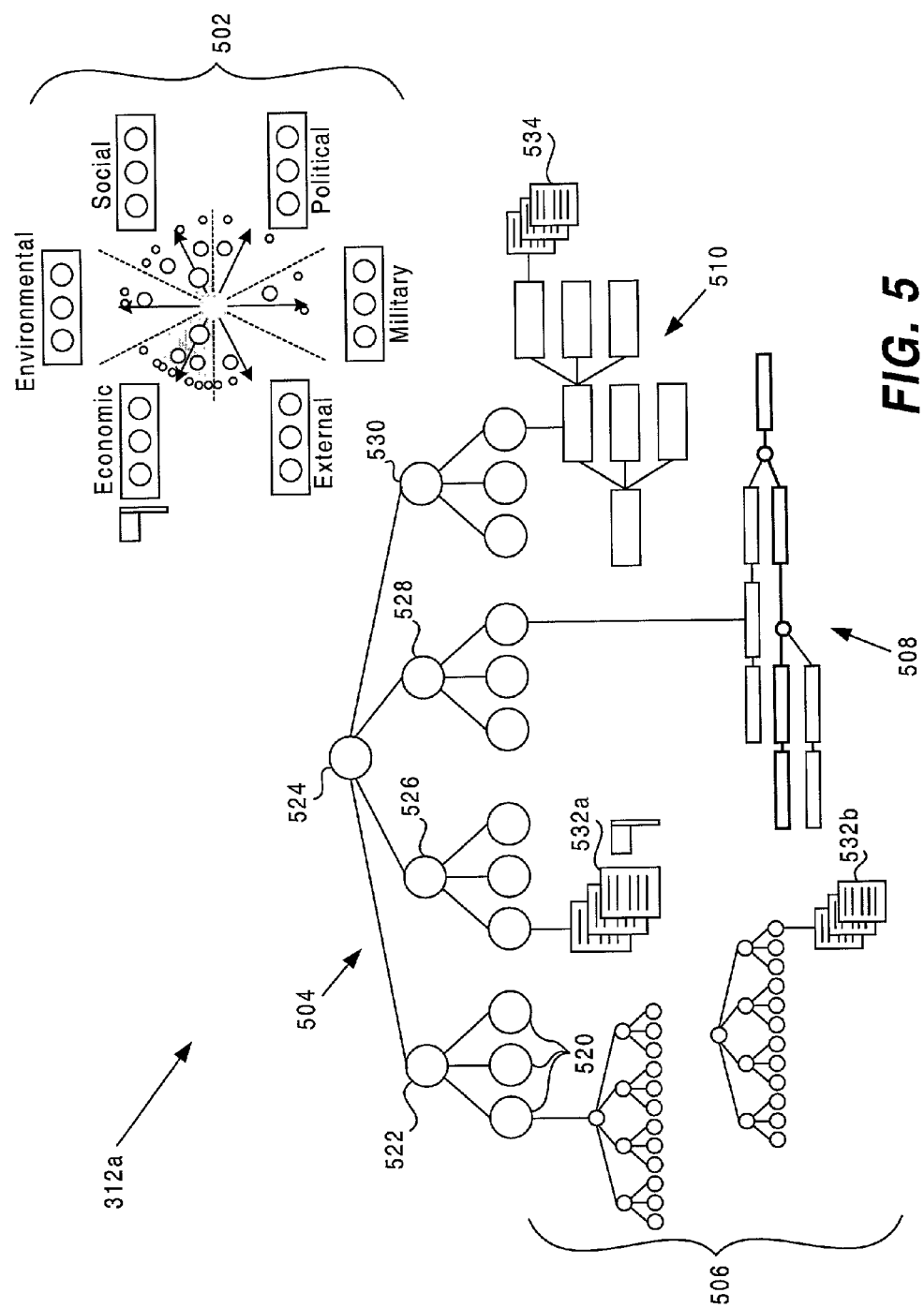
FIG. 5 illustrates a multi-dimensional argument in accordance with one embodiment of the present invention.

FIG. 5 illustrates a multi-dimensional argument 312a in accordance with one embodiment of the present invention. The argument 312a includes a plurality of categories 502 which each contain questions that have been answered to form a particular conclusion regarding a particular situation. Each category has a hierarchy of questions 504 (shown only for the economic category) which are answered to form a conclusion regarding the particular category.

As shown, each answer is represented by a different color or shade which in turn represents a different level of risk or opportunity for a particular question. In the illustrated embodiment, the colors are green, yellow-green, yellow, orange, and red. Green represents a highly likely positive outcome; red represents a highly likely negative outcome; yellow-green indicates a likely positive outcome; orange indicates a likely negative outcome; and yellow indicates an about as likely as not negative or positive outcome. This type of color scheme overlaid onto the tree structure (e.g., tree structure 504 for the economic category) provides an easy to understand mechanism for efficiently conveying the reasoning for the final argument conclusion. Several color schemes are described further below.

Additionally, the answers for children questions may be propagated up to a parent question. That is, the answer for question 524 is formed from the answers 522, 526, 528 and 530. Likewise, the answer for question 522 is formed from answers 520. One of the answers 520 is formed from the answers of a cascaded argument 506.

One or more of the answers may include documentary evidence, e.g., 532a and 532b. Other answers may include other types of supporting evidence. For example, an answer may be supported with a critical path analysis 508 or a query structure 510. One or more of these supporting evidence structures may also include documentary evidence, e.g., 534.

Figure 6:
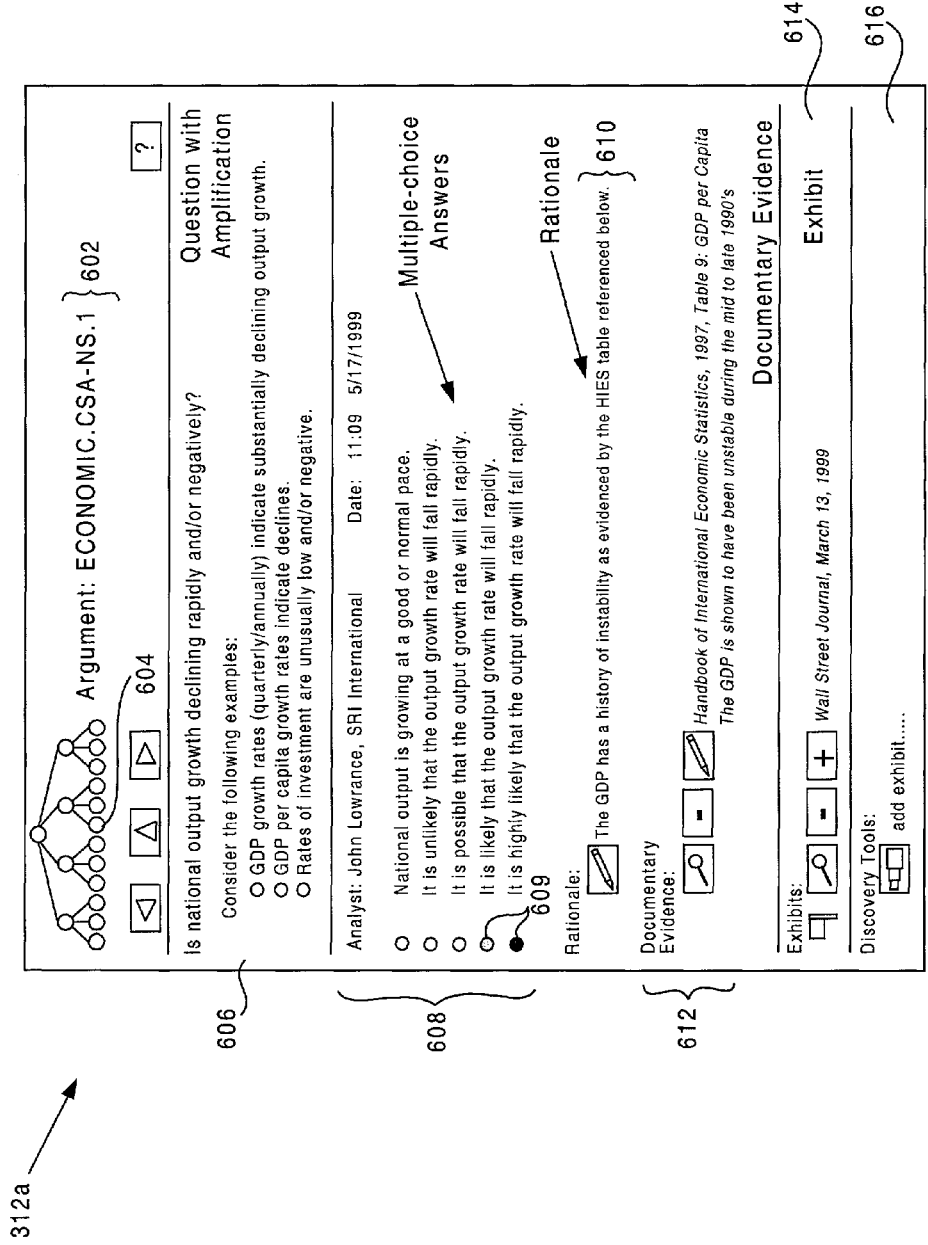
FIG. 6 is a diagrammatic representation of a portion of the argument of FIG. 5 in accordance with one embodiment of the present invention.

FIG. 6 is a diagrammatic representation of a portion of the argument 312a of FIG. 5 in accordance with one embodiment of the present invention. As shown, the argument includes a tree graphic 602 for a hierarchically arranged set of answers. The different answers 602 are each represented by different colors or shades of gray. Any of the answers may be expanded by selected a node within the tree graphic 602. Specifically, the details of answer 604 are expanded below the tree graphic 602. In the illustrated embodiment, the presented question for answer 604 is "Is national output growth declining rapidly and/or negative?" Amplification 606 may also be presented for such question 604. The amplification is part of the initial template upon which this argument is based. Amplification may include any suitable information which the user may consider to answer the question. As shown, a plurality of examples are listed as amplification. Specifically, a user is instructed to consider that:

GDP growth rates indicate substantially declining output growth,

GDP per capita growth rates indicate declines, and

Rates of investment are unusually low and/or negative.

For each question, a list of multiple choice answers 608 are also presented. The user may select one or more of these answers. As shown, the user has selected two answers for answer 604. Preferably, each answer reflects a level of risk or opportunity. That is, each answer indicates a likelihood of a negative or positive outcome for the associated question. Said in another way, each multiple choice question has a categorical scale of likelihood represented by a number of answers. In one embodiment, there may be three answers: highly likely, about as likely as not, and highly unlikely. In the illustrated embodiment, the expanded question has five answers: highly likely, likely, about as likely as not, unlikely, and highly unlikely. In our example, each answer pertains to the likelihood that national output growth will decline. Accordingly, the user may select one or more levels of likelihood that the national output is declining:

National output is growing at a good or normal pace.

It is unlikely that the output growth rate will fall rapidly.

It is possible that the output growth rate will fall rapidly.

It is likely that the output growth rate will fall rapidly.

It is highly likely that the output growth rate will fall rapidly.

After the user selects one or more answers 608, the user may associate one or more rationale for choosing such answers. The rationale generally includes the user's or users' reasons for selecting his or her answers to the associated question. The user may also associate documentary evidence 612 that support his or her answers to the associated question.

The presented question 604 may also include exhibits 614 or discovery tools 616 that may be utilized to answer the associated question. The exhibits 614 are generally documents that are potentially relevant to answering the question. As described above, the discovery tools 616 may include parameterized queries or tools that may be launched to display information or produces results that are relevant to the particular question. An exhibit may be associated with a particular argument question until someone accepts or denies the exhibit's relevance to answering the particular question. This is particular useful in a collaborative environment where a first user is unsure as to how to answer a particular question but thinks that a particular exhibit may be relevant towards answering such question. A second user (or the same first user) may later review the exhibit and verify it's relevance, answer the question based at least in part on the exhibit, and mark the exhibit as documentary evidence.

Figure 7A:
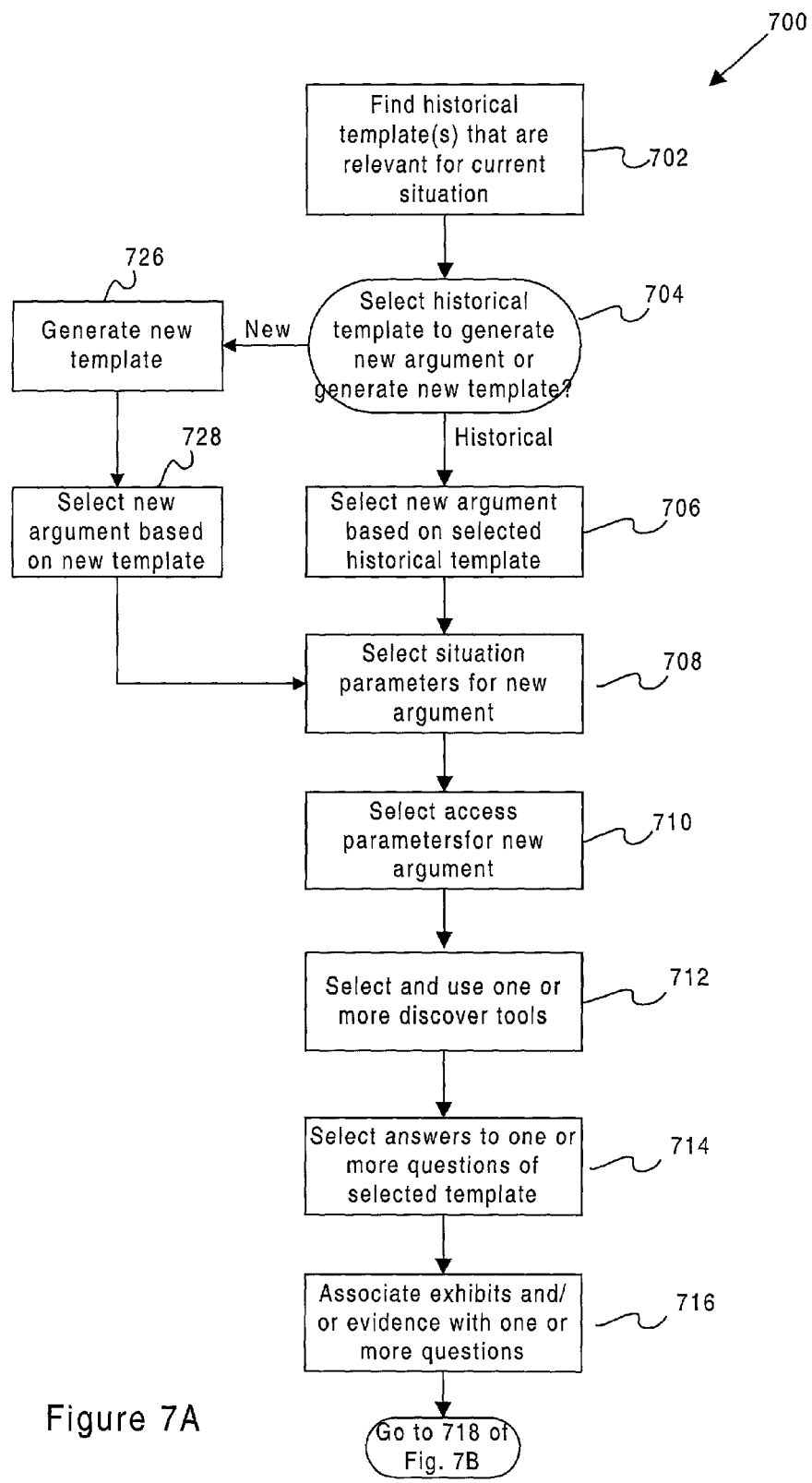
FIGS. 7A and 7B are flowcharts illustrating the procedure for generating an argument in accordance with one embodiment of the present invention.
Figure 7B:
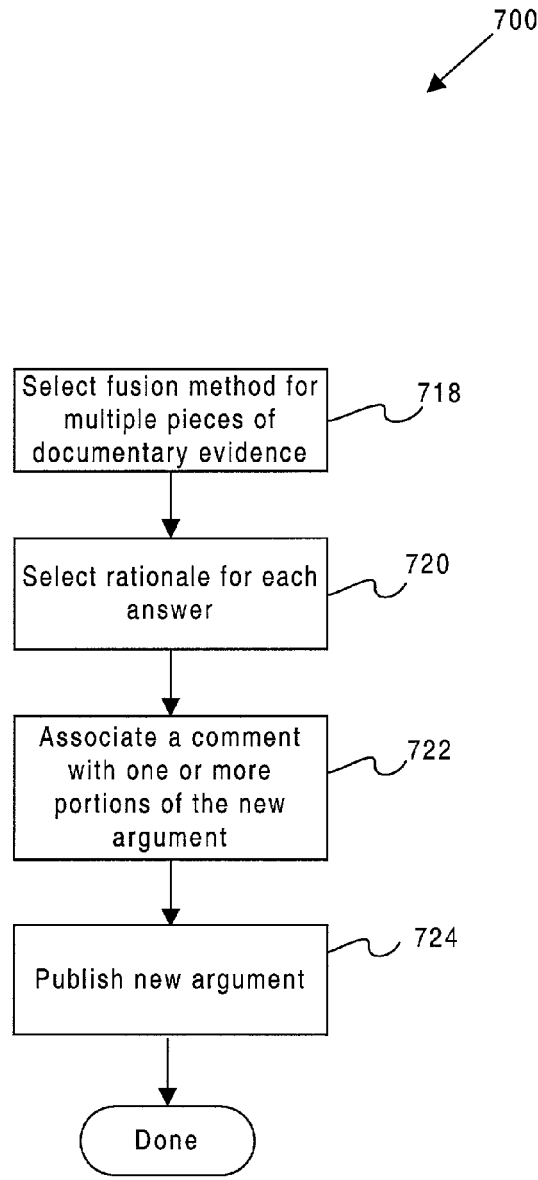

FIG. 7A and 7B are flowcharts illustrating the procedure 700 for generating an argument in accordance with one embodiment of the present invention. Initially, historical templates are found that are relevant to a particular current situation in operation 702. It is then determined whether a historical template is to be selected to generate a new argument or a new template is to be generated in operation 704. Operation 702 may be skipped and a new template generated for the situation (e.g., operation 726).

Figure 8:
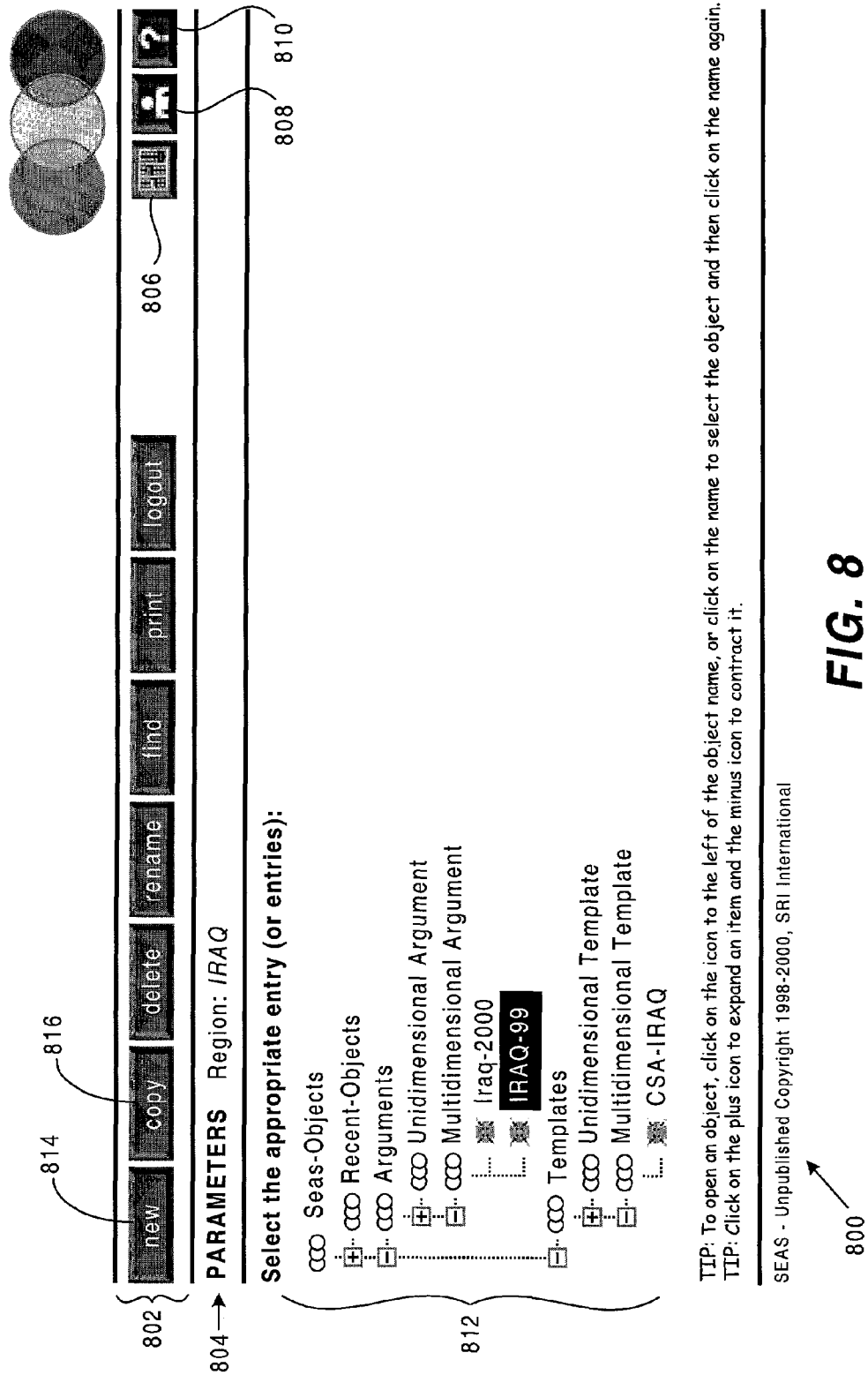
FIG. 8 is a screen shot of an object manager interface in accordance with one embodiment of the present invention.
Figure 9:
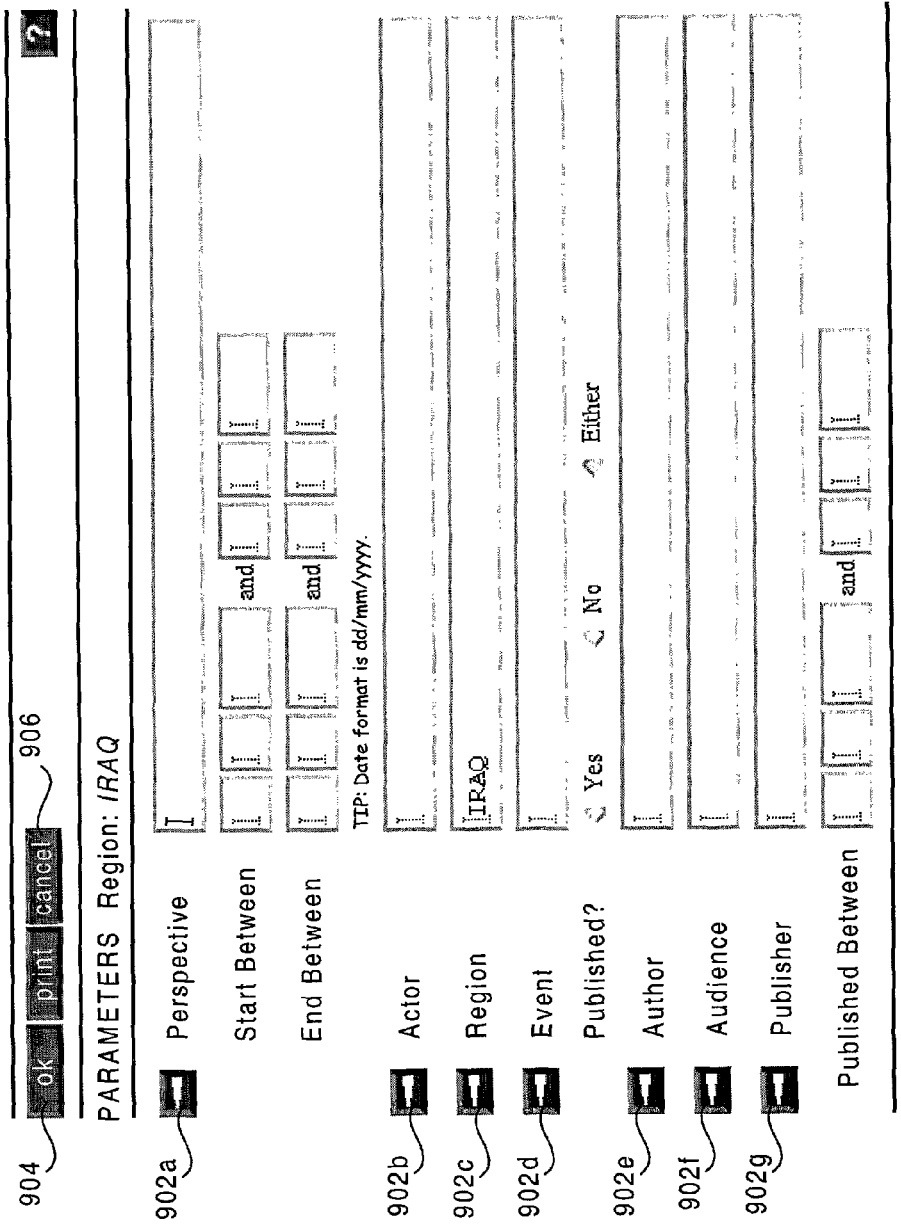
FIG. 9 is an example of a parameter display for entering parameters for retrieving objects.

Any suitable interface may be utilized for facilitating generation of new objects (e.g., arguments and templates) and retrieval of historical or previously generated objects. FIG. 8 is a screen shot of an object manager interface 800 in accordance with one embodiment of the present invention. The object manager 800 is generally responsible for the creation, copying, deleting, retrieval, and opening of arguments and templates. As shown, the object manager 800 is presenting a number of objects in display 812. As shown, there is a button in the toolbar 802 for each of these operations. Additionally, the toolbar 802 includes a print button that prints this current window and a logout button that dismisses the current window and ends the user's session with the argument server 102. On the right of the tool bar 802, a Manager Viewer Parameters Editor button 806 invokes that editor, a Personal Information button 808 invokes a User Information Editor, and a Help button 810 invokes a Help system Objects in this display 812 are retrieved according to search parameters. The current parameter settings 804 are summarized immediately below the toolbar 802. Pushing the Manager Viewer Parameters editor button 806 brings up a parameter display where these setting can be modified. FIG. 9 is an example of a parameter display 900 for entering parameters for retrieving objects. The user can either directly type in the desired criteria or use the discovery buttons (e.g., 902a and 902b) adjacent to some of these fields to hierarchically browse and select the desired option. Once the user has entered the desired criteria, pushing the OK button 904 will cause objects matching that criteria and accessible to the user (see Publishing description below) to be retrieved and displayed in the Manager window 812; pushing the cancel button 906 will return to the Manager 900 without affecting its content.

Thus, a user may search for and retrieve historical templates that are relevant to the current situation through Manager 900. Referring back to FIG. 8, retrieved objects 812 (matching the parameter settings summarized immediately below the toolbar 802) are listed hierarchically in the lower portion of this display. Items that have others items below them in the hierarchy that are not currently visible, have a + button adjacent to them. Clicking on the + button will reveal the items that are immediately below this item in the hierarchy and will change the + to a − button Clicking on a − button causes the item displayed below the associated items to be hidden and causes the − button to be replaced with a + button. When the cursor is positioned over objects representing arguments or templates, the associated situation descriptor and publication information is displayed in a pop-up. Thus, using these buttons, the hierarchy of currently retrieved objects can be incrementally browsed and explored to determine the relevance of particular arguments and templates to the current situation.

By clicking on the icon adjacent to a retrieved historical argument or template, that object may be opened in a Hierarchical Viewer/Editor window (not shown) so the user may assess its relevance. If a retrieved historical template is to be used, a new argument is then instantiated or selected based on the selected historical template in operation 706. Once a relevant historical template is found, the user may select the new button 814 in the toolbar 802 to create a new argument based on the relevant template. Alternatively, one may select the copy button 816 for a currently retrieved relevant argument to create a copy of the retrieved argument that may be changed and formed into a new argument.

After a new argument is selected, situation parameters may then be selected for the new argument in operation 708. FIG. 10 is an example of a situation descriptor viewer/editor 1000 for managing the situation descriptors that are associated with a particular argument and template. Here the situation descriptor viewer/editor 1000 depicts the situation descriptor associated with a multidimensional argument (i.e., IRAQ-99).

In general terms, a situation descriptor describes what an argument or template is about: who is the actor under discussion, what sort of event is under discussion, where (i.e., region) or when the situation occurs (i.e., time interval), and the perspective from which the situation is being analyzed. In the case of a template, the descriptor indicates how a template is intended to be used: for situations in a certain region of the world, or to analyze a particular type of actor, or a particular type of event. In the case of an argument, the descriptor indicates what an argument is about: the actor analyzed, the precise event, where or when the situation under analysis occurred.

Some of the situation descriptor slots (e.g., slots are used with a knowledge base database) may only be filled by selections from a predefined set of terms (e.g., those preceded by a discovery button) while others may be filled with free-form text (e.g., those not preceded by a discovery button). The fixed slots are the primary basis for retrieval: they constitute the equivalent of a library "card catalog" for indexing and retrieving arguments and templates. While the fixed slots might only approximate the true nature of the situation, the free-form slots provide a means to more precisely describe the situation. Using the object manager 900, the fixed slots are first exploited to retrieve potentially relevant arguments and templates, then the free-form slots are examined by the user to make the final determination of relevance.

Figure 11:
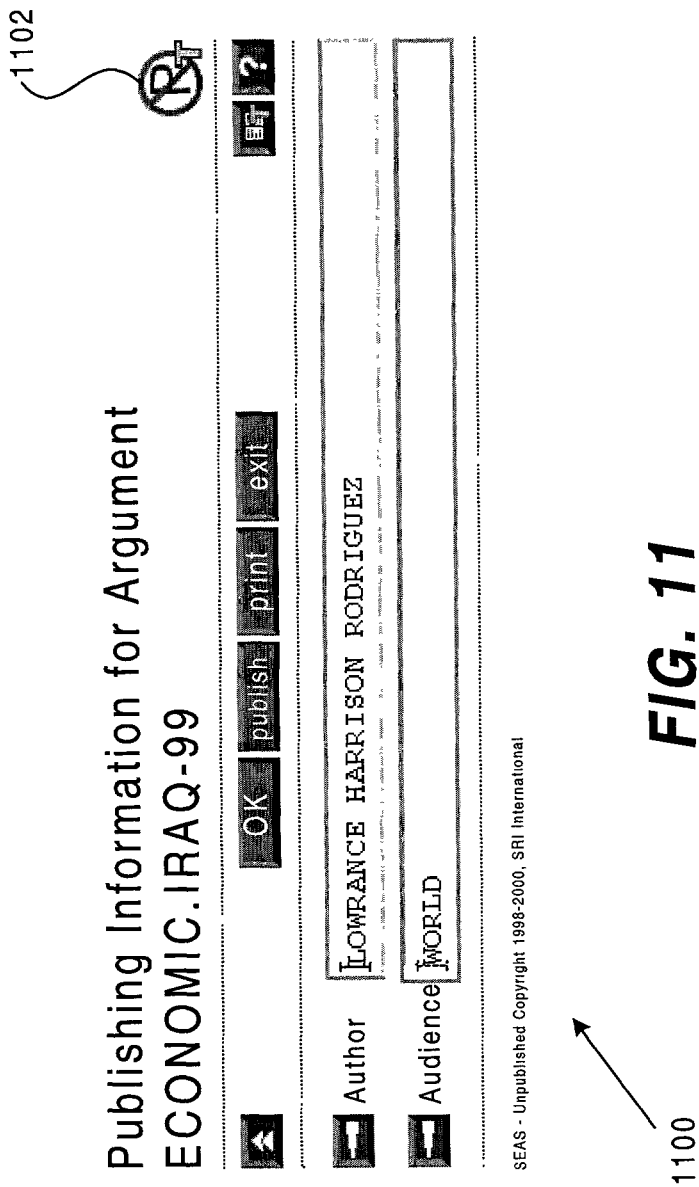
FIG. 11 depicts an access window for displaying and/or modifying the publication information for an unpublished uni-dimensional argument.

Access parameters for the new argument may also be selected in operation 710. Access parameters generally specify who may view and/or edit the new argument. FIG. 11 depicts an access window 1100 for displaying and/or modifying the publication information for an unpublished unidimensional argument (i.e., ECONOMIC.IRAQ-99). The Unpublished Template symbol 1102 indicates that neither this argument nor its underlying template are published; the absence of a "READ ONLY" symbol indicates that the current user can modify this argument.

One or more discovery tools may be selected and used in operation 712. FIG. 6 shows discovery tools 616 being associated with question 606. Answers to one or more questions of the selected template may then be selected in operation 714. FIG. 6 illustrates answers 608 that are presented for question 606. In this illustration, the user has selected two answers by clicking on two selection buttons 609. Exhibits or documentary evidence may also be associated with one or more questions in operation 714. Additionally, previous exhibits may be promoted to evidence. FIG. 6 illustrates documentary evidence 612 and exhibits 614 associated with question 606.

Each question may have more than one piece of supporting evidence. FIG. 12 illustrates a question having two pieces of associated documentary evidence 1202. Each piece of evidence may result in a different answer for the associated question. As shown, each piece of answer has a different set of answers selected.

A fusion method 1204 may also be selected for multiple pieces of evidence in operation 718. The default fusion method is a manual fusion method, where the user must select the answer based on the supporting pieces of evidence. The fusion method is similar to the above described inference method associated with questions. Both the fusion and inference methods determine how answers are combined into a single answer. The fusion method determine how the separate answers formed for each piece of evidence are combined into a single answer to a particular question, while the inference method determines how children answers are combined to form an answer for a higher level parent question. In both methods, the answers may be averaged together, a minimum answer may be selected (most negative outcome) or a maximum answer may be selected (most positive outcome). As shown, the maximum fusion method is selected In the above described red-green color scheme, the answer having the most red shaded lights is used for the final answer in the maximum method and the answer having the most green shaded lights is used for the final answer in the minimum method.

Figure 13:
FIG. 13 illustrates a new memo editor in accordance with one embodiment of the present invention.

One or more rationales may be selected for each answer in operation 720. FIG. 6 illustrates rationale 610 associated with question 606. A comment may also be associated with one or more portions of the new argument in operation 722. One or more users may be selected as having access privileges with respect to a particular comment. On one embodiment, memos are created by filling out all of the fields in the new memo editor 1300 as illustrated in FIG. 13.

The memo Type indicate the purpose of the memo. Memos can be used for any suitable purpose. In the illustrated examples, memos may be used to leave instructions for others on how to use argument/templates, to critique an argument/template, to record overriding assumptions, to attach a summary, to state the context within which this argument/template was/should be used, to indicate what is left to do, or to attach a miscellaneous comment.

The Author and Audience are similar to the author and audience of arguments and templates: authors can modify the memo while members of the audience can view but not modify the memo. These fields can be directly filled out by typing or indirectly with the aid of a browser, invoked by pushing the adjacent discovery buttons. The Subject tells the reader what the memo is about and the Text provides the details. Preferably, the memos are only seen when the object to which they are attached is viewed by members of the Audience or Authors.

When the new argument is complete, the finished argument may then be published in operation 724. Preferably, after an argument is published, it cannot be altered. When alteration is prohibited, users may then rely on a published argument as being stable. If updates for a particular situation and published are desired, a new updated argument may be generated for the particular situation. The new updated argument may reach a different conclusion than the previous argument.

If a historical template is not going to be used, a new template may be generated in operation 726. A new argument may then be selected based on the new template in operation 728. The user may then complete portions of the argument in operations 708-722. The completed argument may then be published in operation 724.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, a template does not have to first be instantiated as an argument before the template questions are answered, etc. Alternatively, a template may become a new argument after it is at least partially completed and saved or upon publication. Accordingly, the present embodiments are to be considered as illustrative and not restrictive, and the invention is not to be limited to the details given herein, but may be modified within the scope and equivalents of the appended claims.

What is claimed is:

1. A method for accessing or generating an argument supporting a conclusion for a given situation, the method comprising:

using a processor, performing steps comprising:
presenting to a user a plurality of searchable templates, wherein a subset of the plurality of searchable templates is relevant to the given situation;
receiving from said user a selection of one of said plurality of searchable templates from said subset that is relevant to the given situation, said one of said plurality of searchable templates being a relevant template most related to the given situation and including a plurality of queries;
displaying said plurality of queries to said user, wherein each of said plurality of queries has a categorical scale of likelihood regarding whether the given situation will likely have a negative or positive result and a plurality of potential responses corresponding to the categorical scale of likelihood, wherein the plurality of queries is formed in a hierarchical structure such that at least some of the plurality of queries are children queries of one or more parent queries;
receiving from said user one or more user responses to said plurality of queries including at least one user response corresponding to at least one of the children queries, where each of said one or more user responses is selected by the user from the plurality of potential responses such that each of the one or more user responses indicates a likelihood of a negative or positive result for an associated one of the plurality of queries;
receiving from said user supporting evidence in response to said plurality of queries, the supporting evidence being relied on by the user to form at least one of the one or more user responses;
evaluating said one or more user responses, in accordance with the likelihood of a negative or positive result indicated by each of said one or more user responses, such that said one or more user responses collectively support a conclusion indicating whether the given situation will likely have a positive or negative result, wherein the evaluating comprises:
automatically propagating a subset of the at least one user response to form an inferred response to at least one of the one or more parent queries;
forming an argument supporting the conclusion of the evaluating, the argument comprising the relevant template, the one or more user responses, the inferred response, the supporting evidence, and the conclusion; and
publishing said argument, including said relevant template, said one or more user responses, said inferred response, said supporting evidence, and said conclusion, for review.

2. The method as recited in claim 1, wherein input to one or more of the plurality of queries is received from a plurality of users over a computer network.

3. The method as recited in claim 2, the method further comprising allowing one or more of the plurality of users to generate and associate comments to at least a portion of the new argument.

4. The method as recited in claim 3, wherein the comments are only accessible by one or more specified users.

5. The method as recited in claim 1, wherein each of the plurality of queries is a multiple choice question.

6. The method as recited in claim 5, wherein each multiple choice question asks to what degree of likelihood will a particular factor related to the given situation have a positive or negative result.

7. The method as recited in claim 6, wherein each multiple choice question has a categorical scale of likelihood represented by a set of responses that partition the categorical scale of likelihood.

8. The method as recited in claim 1, the method further comprising receiving more than one response for at least one of the plurality of queries.

9. The method as recited in claim 1, wherein the inferred response to the at least one of the one or more parent queries is automatically formed using a response technique selected by the user.

10. The method as recited in claim 9, wherein the response technique comprises averaging the subset of the one or more responses to form the inferred response.

11. The method as recited in claim 9, wherein the response technique comprises forming the inferred response using a response from the subset of the one or more responses that indicates a most positive outcome.

12. The method as recited in claim 9, wherein the response technique comprises forming the inferred response using a response from the subset of the one or more responses that indicates a most negative outcome.

13. The method as recited in claim 1, wherein each of the one or more user responses within a first level of the hierarchical structure has a color selected from a subset of colors, each of the plurality of colors representing a different one of the one or more user responses so that colors of the first level convey a line of reasoning.

14. The method as recited in claim 1, wherein one or more of the plurality of queries is associated with a second level of the hierarchical structure and the first level and the second level together form a set of cascaded arguments.

15. The method as recited in claim 1, wherein each of the plurality of searchable templates is associated with a situation descriptor, the method further comprising selecting one of the plurality of searchable templates which is most relevant to the given situation by comparing the given situation to situation descriptors associated with the plurality of searchable templates to thereby find most relevant ones of the plurality of searchable templates having situation descriptors that most closely match the given situation.

16. The method as recited in claim 1, the method further comprising creating a new template, wherein the new template is created by an expert.

17. The method as recited in claim 1, further comprising associating a rationale provided by said user to each of said plurality of queries for which a user response has been received.

18. A non-transitory computer readable storage medium containing executable program instructions for accessing or generating an argument supporting a conclusion for a given situation, the instructions causing a processor to perform steps comprising:
    presenting to a user a plurality of searchable templates, wherein a subset of the plurality of searchable templates is relevant to the given situation;
    receiving from said user a selection of one of said plurality of searchable templates from said subset that is relevant to the given situation, said one of said plurality of searchable templates being a relevant template most related to the given situation and including a plurality of queries;
    displaying said plurality of queries to said user, wherein each of said plurality of queries has a categorical scale of likelihood regarding whether the given situation will likely have a negative or positive result and a plurality of potential responses corresponding to the categorical scale of likelihood, wherein the plurality of queries is formed in a hierarchical structure such that at least some of the plurality of queries are children queries of one or more parent queries;
    receiving from said user one or more user responses to said plurality of queries including at least one user response corresponding to at least one of the children queries, where each of said one or more user responses is selected by the user from the plurality of potential responses such that each of the one or more user responses indicates a likelihood of a negative or positive result for an associated one of the plurality of queries;
    receiving from said user supporting evidence in response to said plurality of queries, the supporting evidence being relied on by the user to form at least one of the one or more user responses;
    evaluating said one or more user responses, in accordance with the likelihood of a negative or positive result indicated by each of said one or more user responses, such that said one or more user responses collectively support a conclusion indicating whether the given situation will likely have a positive or negative result, wherein the evaluating comprises:
        automatically propagating a subset of the at least one user response to form an inferred response to at least one of the one or more parent queries;
    forming an argument supporting the conclusion of the evaluating, the argument comprising the relevant template, the one or more user responses, the inferred response, the supporting evidence, and the conclusion; and
    publishing said argument, including said relevant template, said one or more user responses, said inferred response, said supporting evidence, and said conclusion, for review.

19. The computer readable storage medium as recited in claim 18, further comprising:
    associating a rationale with each of the one or more user responses.

20. The computer readable storage medium as recited in claim 18, wherein input to one or more of the plurality of queries is received from a plurality of users over a computer network.

21. The computer readable storage medium system as recited in claim 20, further comprising:
    allowing one or more of the plurality of users to generate and associate comments to at least a portion of the argument.

22. The computer readable storage medium system as recited in claim 21, wherein the comments are only accessible by one or more specified users.

23. The computer readable storage medium as recited in claim 18, wherein each of the plurality of queries is a multiple choice question.

24. The computer readable storage medium as recited in claim 23, wherein each multiple choice question asks to what degree of likelihood will a particular factor related to the given situation have a positive or negative result.

25. The computer readable storage medium as recited in claim 24, wherein each multiple choice question has a categorical scale of likelihood represented by a set of responses that partition the categorical scale of likelihood.

26. The computer readable storage medium as recited in claim 18, further comprising:

allowing more than one user response for each of the plurality of queries.

27. The computer readable storage medium as recited in claim 18, wherein the inferred response to the at least one of the one or more parent queries is automatically formed using a response technique selected by the user.

28. The computer readable storage medium as recited in claim 27, wherein the response technique comprises averaging the subset of the one or more responses to form the inferred response.

29. The computer readable storage medium as recited in claim 18, wherein each of the one or more user responses within a first level of the hierarchical structure has a color selected from a subset of colors, each of the plurality of colors representing a different one of the one or more user responses so that colors of the first level convey a line of reasoning.

30. The computer readable storage medium as recited in claim 18, wherein one or more of the plurality of queries is associated with a second level of the hierarchical structure and the first level and the second level together form a set of cascaded arguments.

31. The computer readable storage medium as recited in claim 18, wherein each of the plurality of templates is associated with a situation descriptor and the argument server selects one of the plurality of templates which is most relevant to the given situation by comparing the given situation to situation descriptors associated with the plurality of templates to thereby find a most relevant one of the plurality of templates having a situation descriptor that most closely matches the given situation.

32. The computer readable storage medium as recited in claim 18, further comprising:
allowing a creation of a new template, wherein the new template is created by an expert.

* * * * *